United States Patent
Hamel et al.

(10) Patent No.: US 8,303,904 B2
(45) Date of Patent: Nov. 6, 2012

(54) FIXING DEVICE FOR CATALYZER PARTICLES

(75) Inventors: Stefan Hamel, Wenden (DE); Thore Lohmann, Bochum, DE (US); Lothar Semrau, Essen, DE (US)

(73) Assignee: UHDE GmbH, Dortmund (DE)

( * ) Notice: Subject to any disclaimer, the term of this patent is extended or adjusted under 35 U.S.C. 154(b) by 162 days.

(21) Appl. No.: 12/735,840

(22) PCT Filed: Jan. 23, 2009

(86) PCT No.: PCT/EP2009/000405
§ 371 (c)(1),
(2), (4) Date: Aug. 20, 2010

(87) PCT Pub. No.: WO2009/103395
PCT Pub. Date: Aug. 27, 2009

(65) Prior Publication Data
US 2010/0316540 A1 Dec. 16, 2010

(30) Foreign Application Priority Data
Feb. 21, 2008 (DE) .......................... 10 2008 010 422

(51) Int. Cl.
*B01J 8/02* (2006.01)
*B01J 35/02* (2006.01)
(52) U.S. Cl. .................... 422/211; 422/220; 422/222
(58) Field of Classification Search .................. 422/211, 422/222, 220
See application file for complete search history.

(56) References Cited

U.S. PATENT DOCUMENTS

| 5,098,690 A | * | 3/1992 | Koves ........................... 423/659 |
| 6,730,215 B2 | * | 5/2004 | Shiota et al. ................ 210/198.1 |
| 2004/0009108 A1 | * | 1/2004 | Meier et al. ................. 423/244.1 |
| 2007/0100191 A1 | | 5/2007 | Kowoll et al. |

FOREIGN PATENT DOCUMENTS

| DE | 103 59 744 | 7/2005 |
| GB | 684127 | 12/1952 |
| GB | 2 406 802 | 4/2005 |
| WO | WO 02/064237 | 8/2002 |

OTHER PUBLICATIONS

International Search Report, Mar. 2010.
Translation of discussion of Prior Art submitted to EP Patent Office.

* cited by examiner

*Primary Examiner* — Jennifer A Leung
*Assistant Examiner* — Lessanework Seifu
(74) *Attorney, Agent, or Firm* — Collard & Roe, P.C.

(57) ABSTRACT

With the help of a fixing device for catalyzer particles, wherein the catalyzer particles are packed in a bed which can be passed through by a gas flow in the direction of gravity, it is intended to achieve a minimum specific pressure loss which will remain low even if dirt should arise from the operating process; a fixing device which has a minimum influence on the period of presence of the gas flowing through; which ensures the reliable hold-down of the catalyzer particles even at high approach velocities; and which is flexible to a certain degree in order to adapt to bed changes. This is achieved by placing at least one layer of a metal braiding on the packed bed of the catalyzer particles, and the metal braiding consisting of individual metal braiding elements which are firmly braided together.

15 Claims, 2 Drawing Sheets

FIXING DEVICE FOR CATALYZER PARTICLES

CROSS REFERENCE TO RELATED APPLICATIONS

This application is the National Stage of PCT/EP2009/000405 filed on Jan. 23, 2009, which claims priority under 35 U.S.C. '119 of German Application No. 10 2008 010 422.1 filed on Feb. 21, 2008, the disclosure of which is incorporated by reference. The international application under PCT article 21(2) was not published in English.

BACKGROUND OF THE INVENTION

The invention relates to a fixing device for catalyzer particles, wherein the catalyzer particles are provided by a packed bed through which a gas can flow in the direction of gravity.

Catalyzers, in reactors for gas phase reactions, for instance, can be present in the form of particles in a packed bed through which the gas flow passes through in the direction of gravity. It is necessary hereby to fix the particles in order to prevent any undesired particle motions, since such motions might generate wear and tear occurring by abrasion or loss by fragmenting the particles into smaller fractions. This may result in a higher pressure loss in the catalyzer bed, or the particle fragments discharged along with the gas flow may affect downstream plant sections in an undesired way.

The problem is of even higher relevance under certain circumstances in gas phase reactions such as propane or butane dehydration, in which a process gas and a reaction gas have to be mixed prior to their entry into the catalyzer bed. In this regard, the smaller quantity of gas flow may be introduced into the other gas flow at high velocity, for instance, only a very short duration (<100 ms) of presence in the free space prior to entry into the catalyzer bed being tolerated in frequent cases. This fat requires, in addition to high flow velocities, a small distance between the mixing nozzles and the catalyzer surface. Any turbulence generated by the flow against the surface of the packed bed, and even locally formed eddy and backflow under certain circumstances, may lead to some catalyzer particles coming into motion in an undesired way, which may lead to said abrasion and/or particle breakage on the long run.

A number of different approaches are known to prevent such disadvantageous consequences. You may for instance place on the catalyzer bed a layer of very large particles which are mostly inert regarding the intended reaction. You may also use comparably large ceramic balls for this purpose which will fix the packed bed consisting of very small catalyzer particles in a similar way as the one achieved with the large particles. One of the problems, especially when using said procedures in which a short period of presence of the gas flow in the free space in front of the catalyzer bed is required, will be the heavily increased period of presence of the gas flow prior to entering into the catalyzer layer because of its flow through the ball bed. As local channels and free spaces inside the ball bed will hinder any further mixture of the gases, optimum mixing should already have taken place above the balls so that the flow through the balls will only increase the period of presence, but not represent the mixing track itself.

When using balls which are comparably large in relation to the catalyzer particles, one of the problems will be that said balls will often lead to irregular packing with industrial reactors, thus rendering the surface of the ball bed which faces the gas nozzles also irregular. The surface, which is now, on the basis of the large balls, substantially coarser and which has a stochastic structure, will increase its tendency to form local eddy and recirculation zones, which again means another negative influence on the period of presence of the gas mixture.

Another publicly known possibility to fix catalyzer particles in a packed bed consists in the covering of the bed with a permanently mounted perforated metal sheet. This would raise the problem of the catalyzer bed yielding and slumping during operation. Local hollow spaces could form underneath the sheet, which could by themselves generate recirculation zones and similar turbulence, with the result that particles could be set in motion thus leading to the disadvantageous consequences described in the foregoing. This effect is then reinforced by the acceleration of gas flow into and through the perforations in the perforated sheet.

It is the purpose of the invention to provide, in particular for packed beds which can be passed through in the direction of gravity, a fixing device for catalyzer particles which does not have the disadvantages described in the foregoing and which especially suffers from little specific pressure loss, which will remain low even if dirt should arise from the operating process; a fixing device which has a minimum influence on the period of presence of the gas flowing through; which ensures the reliable hold-down of the catalyzer particles even at high approach velocities; and which is flexible to a certain degree in order to adapt to bed changes.

The invention achieves this goal with the fixing device for catalyzer particles characterised in the detailed description below.

The fixing device of the invention means that, in a reactor, as it is described in the applicant's DE 103 59 744 A1, for instance, a layer of a metal braiding, consisting of single metal braiding elements which are firmly braided together is placed on the catalyzer particles bed. The particles are held down by the dead weight of said metal braiding. The fact that the uppermost particle layer is jammed within the metal braiding will furthermore prevents the particles from moving transversally.

SUMMARY OF THE INVENTION

The thickness of the metal braiding is relatively small so that the period required by the gas to flow through prior to entering into the catalyzer layer is extremely short. Pressure losses are reduced to a minimum by a favourable ratio between the metal braiding cross-section and the thickness of the material. The metal braiding is also flexible, therefore ensuring reliable fixation as described above even in cases where the catalyzer bed slumps, which means that the underside of the metal braiding will not lose contact with the surface of the catalyzer particles.

Advantageous embodiments of the invention are provided as options below. It is provided, for example, that the metal braiding is designed so that the maximum metal braiding element cross-section remaining free will not be smaller than the smallest cross-section of the catalyzer particles. This will prevent the catalyzer particles being whirled up through the metal braiding and destroyed. The described jamming effect is achieved in a particularly advantageous way here again, ensuring reliable fixation of the particles even if the gas flows through at high flow velocities.

It may be provided that the single metal braiding elements are of a closed design. A metal braiding made of closed metal braiding elements offers a particularly advantageous ratio between flexibility and dead weight, which will have a positive influence on the function of the fixing device.

It may also be provided that the metal braiding elements are designed in an oval and/or ring shape. The braiding of ring-shaped elements may be advantageous from a production aspect. The elements can however also be shaped oval or have any other form, which may be preferable under the circumstances of a certain case of application.

It is advantageous that each of the metal braiding elements has a firmly closed and/or welded design. It is generally imaginable that the metal braiding consists of rings which are only pressed together, but the achievable strength of such a design is frequently not sufficient so that a durable closure of rings or their welding would be preferred in the usual case of application.

In an advantageous embodiment, the size of the surface area of the metal braiding is larger than the surface area of the catalyzer particle bed. When you place the metal braiding on the catalyzer bed, you can hereby prevent tensions inside the metal braiding. The loose placement of the metal braiding allows its following whenever the bed slumps, thus providing for continued full surface contact with the surface of the bed. Any local unevenness of the bed surface will be easily compensated for by the loose placement of the metal braiding.

It is advantageous if the size of the area of the metal braiding is 1.05 to 2 times the size of the surface area of the catalyzer particle bed. These values of the size of the metal braiding as compared to those of the catalyzer particle bed surface have come out as particularly advantageous.

It may also be advantageous that you place at least one other layer of a metal braiding on top of the first metal braiding layer. For example, in cases where the approach velocities of the flow are very high above the bed, or if you have to use a very fine-mesh metal braiding on the grounds of the use of very small catalyzer particles, the application of another metal braiding layer can significantly increase the fixation effect of the bottom metal braiding layer.

In this case, the mesh size of the metal braiding layer sitting on top need not be identical to the mesh size of the bottom metal braiding. It may be an advantage that the maximum possible free cross-section of the additional metal braiding layers is either equal to or larger and/or smaller than the maximum possible free cross-section of the first metal braiding layer.

Especially when using a metal braiding with a larger free cross-section, the press-on effect can be increased by installing additional weight through a second or several other layers of a coarser metal braiding, the fixation occurring through the bottom metal braiding layer which has a small free cross-section for fixing the particles. Reliable fastening is ensured by fixing the metal braiding layer to the reactor wall.

In an embodiment, at least one installed metal braiding layer can consist of several segments connected to each other. In addition to an interconnected embodiment of the metal braiding, it may be an advantage—in view of the production process or for assembly reasons—to use smaller segments for the metal braiding which are linked to each other. The segments can mainly be linked at their seams in abutting relationship, or they may overlap at their seams. This will depend on the structural design of the reactor and other parameters which will result from the specific requirements.

It may also be advantageous to make the metal braiding from a catalytically active material and/or coat it with a catalytically active material. In some applications, the efficient period of presence of the gas flow above the catalyzer bed can thus be further reduced.

It may be an advantage to make the metal braiding from an anticorrosion material and/or provide it with anticorrosion protection. This will also depend on the application, especially the used reaction gases and catalyzer materials, possible intended in order to reduce the wear and tear of the metal braiding during operation.

It is advantageous to design the fixing device so that it can be used in an oxy reactor for the dehydration of butane and/or propane. The invention has proven to be especially efficient in such an application.

The invention also relates to a method for holding down catalyzer particles with a fixing device as described in the foregoing, having the characteristics of a method for holding down catalyzer particles with a fixing device of the invention wherein at least one layer of metal braiding is placed on top of the catalyzer particle bed in order to fix the catalyzer particles in the bed. The invention also relates to a reactor for gas phase reactions having the characteristics of a reactor for gas phase reactions with a catalyzer, consisting of catalyzer particles in a packed bed, wherein the catalyzer particles are fixed with the fixing device of the invention.

BRIEF DESCRIPTION OF THE DRAWINGS

The invention shall be explained in detail in the following on the basis of the drawing as an example and not limited to it. The drawing shows in FIG. 1 a strongly simplified representation of a gas phase reactor including the fixing device of the invention.

DETAILED DESCRIPTION

Figure 1:
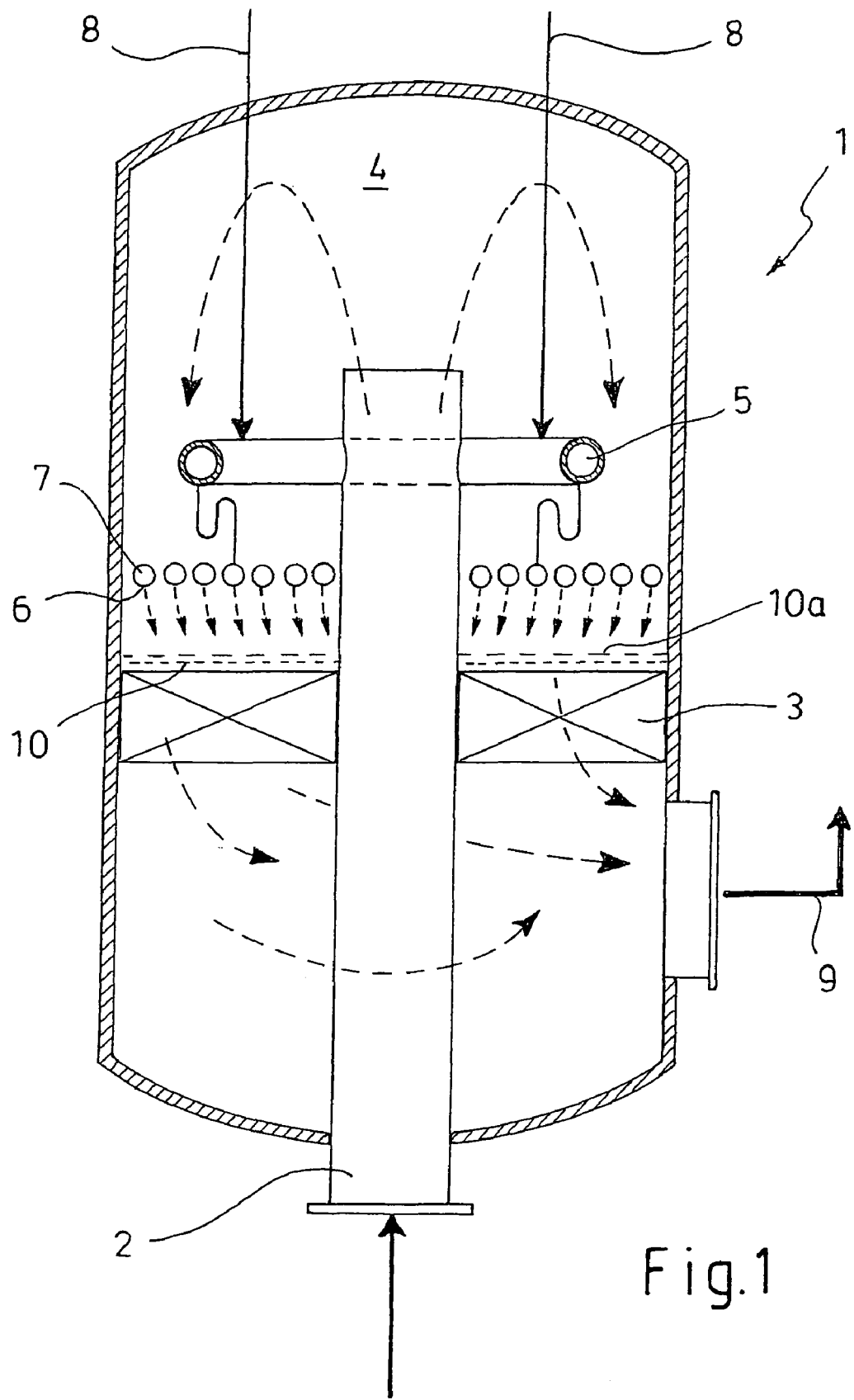

The gas phase reactor, generally called 1, which is schematically displayed in FIG. 1 as a section, is provided with a gas inlet tube 2 which goes through the central area of a horizontally arranged catalyzer 3, wherein a gas dome 4 is arranged above the catalyzer bed in the reactor.

The central gas inlet tube 2 is encompassed by a ring dispenser 5 for oxygen in the pure form, as air or mixed with inert gas or water steam, wherein this ring tube 5 supplies a multitude of ring tubes 7 provided with outlet orifices 6 which are located above the catalyzer 3. $O_2$ entry into the ring dispenser 5 is only indicated by arrows 8, the gas discharge from the reactor also only being indicated with the reference number 9. Below the free space in which both gases will mix there is a layer of a metal braiding 10 according to the invention.

The metal braiding 10 is larger in surface area than the size of the surface of catalyzer bed 3, with the result that it is loosely sitting on the bed 3 compensating for local unevenness. Should the bed 3 slump, it will have continued full surface contact. On the first layer of the metal braiding 10, there is another layer 10a of a metal braiding according to the invention, this layer consisting of larger metal braiding elements 11 than those of the first metal braiding layer, in which the free cross-section is smaller than the smallest size of the particles in the catalyzer particle bed.

Figure 2:
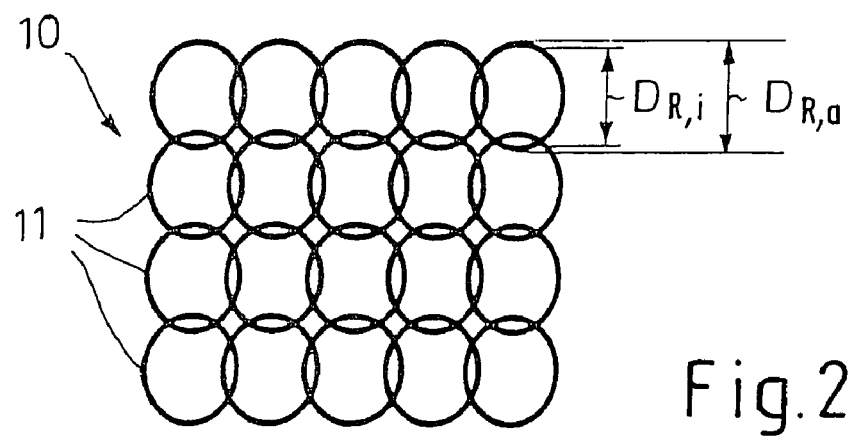
FIG. 2 a schematic, plan view of a metal braiding according to the invention in its tensioned condition.
Figure 3:
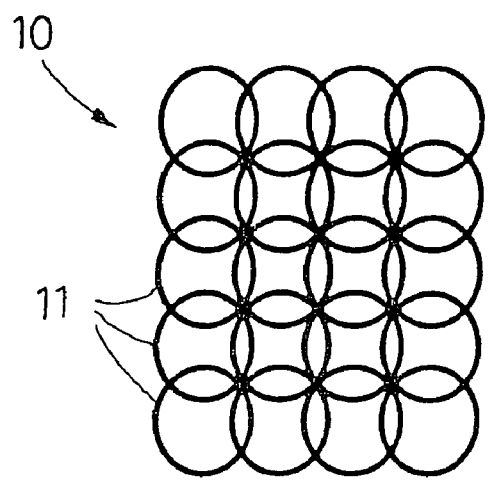
FIG. 3 an example of a metal braiding according to the invention in its installed, relaxed condition; as well as in FIG. 4 a schematic display of one single mesh of a metal braiding according to the invention.

A plan view of a metal braiding 10 according to the invention is given in FIG. 2 and/or FIG. 3, where FIG. 2 shows the metal braiding in the tensioned condition. This regards the metal braiding layer which is directly placed on top of the particle bed, in which the free cross-sections of the orifices in the metal braiding are chosen so that they will remain smaller than the smallest size of particles existing in the catalyzer bed even though the condition may be tensioned.

In the application of the metal braiding represented in FIG. 3, the metal braiding is relaxed and loosely sits on top of the bed surface.

In both cases of application, the particles are thus jammed within the orifice of metal braiding 10, with the efficient result that they cannot whirl upward and that also any transverse movements of the particles vertically to the gas flow are impossible, thus preventing their damage and therefore all negative consequences.

Figure 4:
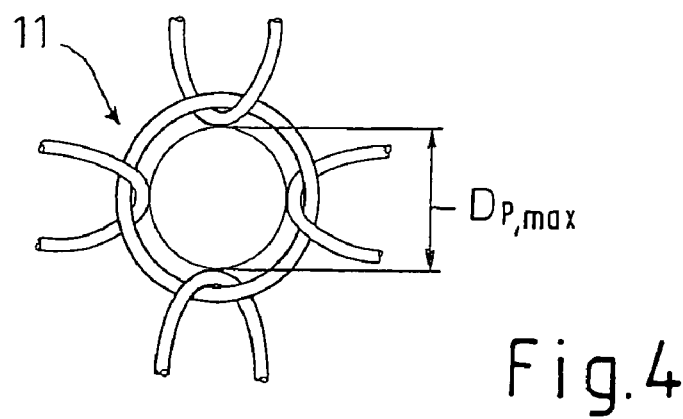

As shown in FIG. 4, one embodiment of the metal braiding 10 of the invention consists of round, annular, closed metal braiding elements 11, which are welded at their joints so that they cannot bend up even though tensile loads may be applied. It is also evident that the diameter of the metal braiding rings need not be compulsorily smaller than the lowest particle size, since the smallest free cross-section is smaller than the radius orifice of any single ring element, depending on the ring thickness.

The invention is not limited to this example of application, of course, but may be modified in a large number of versions without abandoning the basic principle, in particular the materials of the metal braiding, the catalyzer particles and the gases, gas mixtures etc. flowing through may be chosen in adaptation to the purpose of each area of application, still being covered by the invention; the same is true for the design of the metal braiding proper so long as it has the claimed characteristics.

The invention claimed is:

1. A fixing device for catalyzer particles, wherein the catalyzer particles are provided by a packed bed through which a gas can flow in the direction of gravity,
    wherein at least one layer of a metal braiding is placed on top of the bed of catalyzer particles, the metal braiding consisting of individual metal braiding elements which are braided together, wherein the metal braiding is designed so that a maximum possible free cross-section of the metal braiding element is smaller than the smallest cross-section of the catalyzer particles, and wherein the individual metal braiding elements are in a closed pattern and wherein the metal braiding elements are of a ring-shaped design.

2. The fixing device according to claim 1, wherein the metal braiding elements are of an oval shaped design.

3. A fixing device according to claim 1, wherein each of the metal braiding elements is firmly closed and/or welded.

4. A fixing device according to claim 1, wherein the size of the surface area of the metal braiding is larger than the surface area of the bed of catalyzer particles.

5. A fixing device according to claim 4, wherein the size of the area of the metal braiding is 1.05 to 2 times the size of the surface area of the bed of catalyzer particles.

6. A fixing device according to claim 1, wherein at least one other layer of a metal braiding is placed on top of the first layer of metal braiding.

7. A fixing device according to claim 6, wherein a maximum possible free cross-section of the metal braiding elements of the additional metal braiding layer is smaller than the maximum possible free cross-section of the metal braiding elements of the first layer of metal braiding.

8. A fixing device according to claim 1, wherein the at least one layer of metal braiding is made of several segments which are linked together.

9. A fixing device according to claim 8, wherein the segments are mainly linked at their seams in abutting relationship and/or they partially overlap at their seams.

10. A fixing device according to claim 1, wherein the metal braiding is made from a catalytically active material and/or coated with a catalytically active material.

11. A fixing device according to claim 1, wherein the metal braiding is made from an anticorrosion material and/or provided with anticorrosion protection.

12. A fixing device according to claim 1, wherein the fixing device is configured to fit in an oxy reactor for the dehydration of butane and/or propane.

13. A method for holding down catalyzer particles with a fixing device according to claim 1, wherein at least one layer of metal braiding is placed on top of the catalyzer particle bed in order to fix the catalyzer particles in the bed.

14. A reactor for gas phase reactions with a catalyzer, consisting of catalyzer particles in a packed bed, wherein the catalyzer particles are fixed with a fixing device comprising:
    a packed bed of catalyzer particles through which a gas can flow in the direction of gravity,
    at least one layer of a metal braiding is placed on top of the bed of catalyzer particles, the metal braiding comprising individual metal braiding elements which are braided together, wherein the metal braiding is designed so that a maximum possible free cross-section of the metal braiding element is smaller than the smallest cross-section of the catalyzer particles, and wherein the individual metal braiding elements are in a closed pattern and wherein the metal braiding elements are of a ring-shaped design with at least one metal braiding element comprising an oval.

15. A fixing device according to claim 6, wherein a maximum possible free cross-section of the metal braiding elements of the additional metal braiding layer is not smaller-than the maximum possible free cross-section of the metal braiding elements of the first layer of metal braiding.

\* \* \* \* \*